Patented Oct. 2, 1934

1,975,340

UNITED STATES PATENT OFFICE 1,975,340

AZO DYES

Henry Wenker, Elizabeth, N. J.

No Drawing. Application November 16, 1933,
Serial No. 698,320

3 Claims. (Cl. 260—94)

The invention relates to the manufacture and production of new azo dyes containing a dinitrobenzene nucleus which are of value as chemical indicators. Paper, or other material dyed with a dyestuff of the present invention also constitutes part of the invention.

The new dyestuffs can be obtained by coupling in a mineral acid solution diazo-2-4-dinitrobenzene with alpha-naphtholsulfonic acids. The new dyestuffs thus obtained most probably correspond with the following general formula

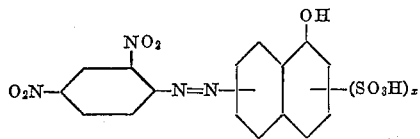

wherein $x$ signifies an integer having the value of 1, 2 or 3.

The new dyestuffs, in the dried and pulverized state and in the form of their neutral alkali metal salts, constitute red or brown powders soluble in water giving yellow to red solutions which change, upon addition of alkali, to dark blue, and yield upon reduction with stannous chloride and hydrochloric acid 1-2-4-triaminobenzene and an aminonaphthol sulfonic acid. The new dyestuffs, in the dried and pulverized state and in the form of their basic alkali metal salts, constitute dark powders soluble in water giving dark blue solutions, and probably correspond to the following general formula

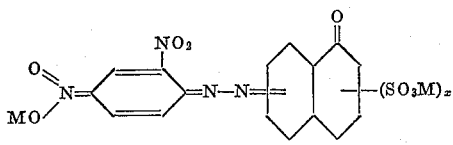

wherein $x$ signifies an integer having the value of 1, 2 or 3 and M signifies an alkali metal.

The new dyes are unsuitable for ordinary dyeing purposes on account of their sensitivity to alkali; they are of value as chemical indicators.

The following specific examples will further illustrate the invention, but it is understood that the invention is not limited thereto. The parts are by weight.

Example 1.—18.3 parts of 2-4-dinitroaniline are diazotized by dissolving in 183 parts of concentrated sulfuric acid and adding 6.9 parts of sodium nitrite. The solution of diazo-2-4-dinitrobenzene thus obtained is diluted with 600 parts of ice and combined with a solution of 30.4 parts of 1-naphthol-3-6-disulfonic acid in 300 parts of water. After 1 hour the dyestuff is salted out by addition of 100 parts of common salt and the dyestuff filtered off, washed with salt solution, pressed and dried. The new dyestuff thus obtained, in the form of its neutral sodium salt, most probably corresponds with the following formula:

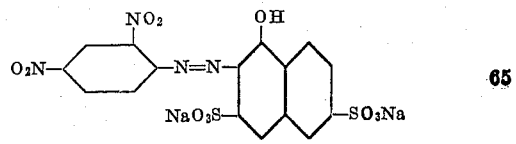

and in the dry and pulverized state is a brown powder soluble in water with yellow color which upon addition of alkali changes to dark blue, soluble in concentrated sulfuric acid with violet color. Upon reduction with stannous chloride and hydrochloric acid it yields 1-2-4-triamino benzene and 2-amino-1-naphthol-3-6-disulfonic acid.

Example 2.—18.3 parts of 2-4-dinitroaniline are diazotized as in Example 1 and the diazo solution is combined with a solution of 22.4 parts of 1-naphthol-4-sulfonic acid in 300 parts of water. After ½ hour the dyestuff is filtered off, washed with salt solution, pressed and dried. The new dyestuff thus obtained, in the form of its neutral sodium salt, most probably corresponds with the following formula:

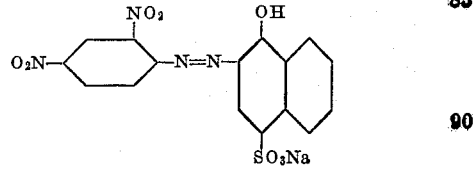

and in the dry and pulverized state is a red powder soluble in water with orange color which upon addition of alkali changes to blue, soluble in concentrated sulfuric acid with blue color. Upon reduction with stannous chloride and hydrochloric acid it yields 1-2-4-triamino benzene and 2-amino-1-naphthol-4-sulfonic acid.

I claim:

1. Azo dyestuffs obtained by combining molecular quantities, in mineral acid solution, of diazotized 2-4-dinitroaniline and alpha-naphthol sulfonic acids containing 1 to 3 sulfonic acid groups, which dyestuffs in the dried and pulverized state, and in the form of their neutral alkali metal salts are red or brown powders soluble in water with yellow to red color, soluble in alkaline media with blue to violet color, yielding upon reduction with stannous chloride and hydrochloric acid 1-2-4-triamino benzene and aminonaphtholsulfonic acids, which dyestuffs may be employed as chemical indicators.

2. The azo compound of the following formula:

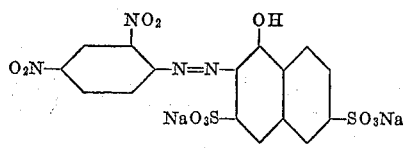

which product represents when dry a brown powder, soluble in water with a yellow coloration which changes to blue upon addition of alkali.

3. The azo compound of the following formula:

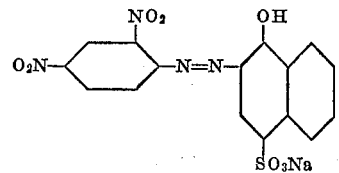

which product represents when dry a red powder, soluble in water with an orange coloration which changes to blue upon addition of alkali.

HENRY WENKER.